(No Model.)

W. MUNRO.
FASTENING DEVICE.

No. 573,685. Patented Dec. 22, 1896.

WITNESSES:
G. W. Kisenbraun
Wm. T. Donnelly.

INVENTOR:
William Munro,
BY A. Faber du Faur
ATTORNEY

UNITED STATES PATENT OFFICE.

WILLIAM MUNRO, OF BROOKLYN, NEW YORK, ASSIGNOR TO THE CITY METAL WORKS, OF NEW YORK, N. Y.

FASTENING DEVICE.

SPECIFICATION forming part of Letters Patent No. 573,685, dated December 22, 1896.

Application filed July 11, 1896. Serial No. 598,808. (No model.)

*To all whom it may concern:*

Be it known that I, WILLIAM MUNRO, a citizen of the United States of America, and a resident of Brooklyn, in the county of Kings and State of New York, have invented certain new and useful Improvements in Fastening Devices, of which the following is a specification.

My invention has reference to improvements in fasteners, and in particular to skirt-supporters adapted for attachment to the belt and skirt for the support of the latter.

It has for its object to provide a device which is simple in construction and can be attached to the skirt without perforating or otherwise injuring the fabric.

To this end my invention consists, essentially, in a fastener composed of two members slidably connected and provided with tongues adapted to overlap each other to secure the skirt or other article, combined with a lock or catch for holding the members in their assumed positions.

The nature of my invention will best be understood when described in connection with the accompanying drawings, in which—

Figure 1:
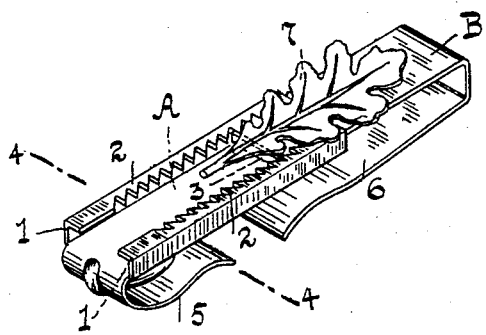
Figure 2:
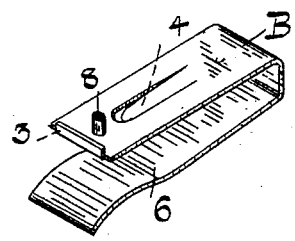
Figure 3:
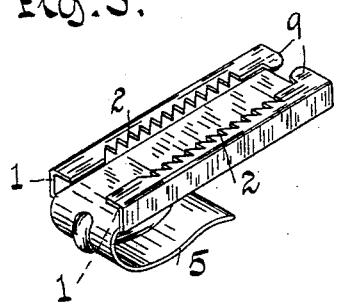
Figure 4:
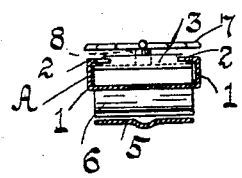
Figure 5:
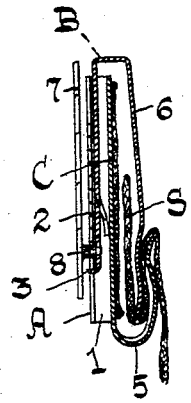

Figure 1 is a perspective of a skirt-supporter embodying my invention, the same being shown in position ready for application. Fig. 2 is a perspective of one of the members. Fig. 3 is a similar view of the second member. Fig. 4 is a transverse section on the line 4 4, Fig. 1. Fig. 5 is a longitudinal section showing the supporter applied to a belt and skirt.

Similar letters and numerals of reference designate corresponding parts throughout the several views of the drawings.

Referring to the drawings, the letter A designates one of the members of the fastener, which is constructed with guideways 1 for the second member B, in which the said latter member can slide to and fro. Said guide is formed by striking up the first member in channel form with overhanging tops formed with teeth 2. The member B has its inner end turned up or otherwise formed into a lip 3, adapted to engage with the teeth 2, formed in the member A, so as to hold the latter member in any position in which it may be brought with respect to the first member A. In the present instance I have shown the member B provided with a spring-tongue 4, adapted to bear against the second member to hold the lip 3 in contact with the teeth 2, so that upon depression of the upper portion of said member B the lip 3 is disengaged from the teeth 2 to permit reciprocation of said member with respect to the member A. Both members are provided with tongues 5 and 6, respectively, of which the tongue 6 in its normal condition projects in a plane outside of the end of the tongue 5. When the fastener is applied, as shown in Fig. 5, the member B is compressed, thereby releasing the lip 3 from the teeth 2 and placing the tongue 6 in a plane inside of the plane of the tongue 5, and on telescoping the two members the skirt-band or other article S is drawn inwardly and downwardly between the two tongues, thereby holding it securely to the fastener. The two tongues at the same time form a loop through which the belt C is passed.

It is evident that the fastener shown can be employed for many purposes, such, for instance, as a curtain or cuff fastener, napkin or towel holder, stocking-supporter, &c. In the present example I have shown the member B provided with an ornamental head 7, attached to the same by suitable posts 8 in the usual way, said head being adapted to cover the device when in its closed state. The front end of the member A may be provided with stops 9 9, adapted to limit the outward motion of the member B and to prevent its entire separation from the member A. While the ends of the tongues may be made straight, I prefer to curve the same substantially concentrically, as shown in Fig. 5, so as to obtain a better grip upon the fabric.

It is also evident that the teeth could be formed on the lower sides of the overhanging tops of the member A, or they could be formed by a series of holes in the sides of said member.

What I claim as new is—

1. A fastener comprising two members slidably connected and provided with interlocking devices combined with opposite tongues adapted to overlap for the retention of the fabric, substantially as described.

2. A fastener composed of two members slidably connected, one of which is provided with a series of teeth on opposite sides and the other with a lip adapted to engage with said teeth, combined with tongues forming part of said members and adapted to overlap for the retention of the fabric, substantially as described.

3. A fastener composed of two members slidably connected, one of which is provided with a series of teeth on opposite sides and the other with a lip adapted to engage with said teeth, and with a spring-tongue adapted to maintain said lip in connection with said teeth, combined with tongues forming part of said members and adapted to overlap for the retention of the fabric, substantially as described.

4. A fastener composed of two members slidably connected, one of which is provided with a series of teeth on opposite sides and the other with a lip adapted to engage with said teeth, combined with concentrically-curved tongues forming part of said members and adapted to overlap for the retention of the fabric, substantially as described.

In testimony that I claim the foregoing as my invention I have signed my name, in presence of two witnesses, this 23d day of June, 1896.

WILLIAM MUNRO.

Witnesses:
EUGENIE A. PERSIDES,
A. FABER DU FAUR, Jr.